United States Patent [19]

Nakahama et al.

[11] 4,333,001
[45] Jun. 1, 1982

[54] METHOD FOR WELDING AN IMPELLER

[75] Inventors: Syuhei Nakahama; Etsu Yamashita, both of Chiba, Japan

[73] Assignee: Carrier Corporation, Syracuse, N.Y.

[21] Appl. No.: 248,418

[22] Filed: Mar. 27, 1981

Related U.S. Application Data

[62] Division of Ser. No. 72,843, Sep. 6, 1979, Pat. No. 4,296,308.

[30] Foreign Application Priority Data

Sep. 6, 1978 [JP] Japan ................................ 53-109274

[51] Int. Cl.³ .............................................. B23K 9/00
[52] U.S. Cl. .................................. 219/125.1; 219/107; 219/137 R; 219/159
[58] Field of Search ................. 219/125.1, 137 R, 159, 219/107

[56]  References Cited

U.S. PATENT DOCUMENTS 3,104,313  9/1963  Rieppel ............................ 219/125.1
3,140,385  7/1964  Johnston ......................... 219/137 R
3,639,724  2/1972  Gerath ............................ 219/137 R Primary Examiner—Elliot A. Goldberg
Attorney, Agent, or Firm—Wenderoth, Lind & Ponack

[57] ABSTRACT

A method and an apparatus for welding an impeller by using TIG process are provided in which one of the blades to be welded to a side plate or shroud plate is disposed so as to form a V-channel with the plate, the V-channel being oriented to face upwardly, and a torch head supported at the tip of a torch rod is placed above a weld line produced by the intersection of the blade and the plate so as to contact the inner surface of the V-channel keeping a proper distance between the tip of the tungsten electrode encased within the torch head and the weld line on which a filler wire of suitable length is disposed. The opposite end of the torch rod is mounted on a translating mechanism through a universal joint so as to move the torch head along and above the weld line and electric current is supplied between the weld line on which the filler wire is disposed and the electrode while simultaneously supplying an inert gas through the nozzle during the movement of the nozzle, the nozzle keeping in contact with the inner surface of the V-channel due to gravity.

3 Claims, 7 Drawing Figures

METHOD FOR WELDING AN IMPELLER

This application is a division of application Ser. No. 72,843, filed Sept. 6, 1979, now U.S. Pat. No. 4,296,308.

FIELD OF THE INVENTION

The present invention relates to welding in a confined space and more particularly to a welding method and an apparatus therefor for welding blades to a shroud plate to complete an impeller.

BACKGROUND OF THE INVENTION

Heretofore, in order to weld blades of an impeller having a narrow discharge width to a shroud plate, which must be performed within a confined space or a space to which it is difficult to gain access due to a limited small space, arc welding using a coated electrode has been generally employed. However, the surface of the bead according to this welding is not smooth, but is rather rough, thereby producing undesirable notch sensitivity at the toes of the weld bead. In order to improve the fatigue strength in such case, it is necessary to trim or cut the toes of the weld bead and to smooth the surface of the bead. Further, in arc welding using a coated welding wire, spattering is likely, and the spatter produced must also be removed. However, since the width of discharge port of the impeller is narrow, not only the welding operation itself but also the post-welding operations such as trimming and finishing the rough surface are difficult and consume many man hours.

To obviate such drawbacks, automatic welding with NC-control has been considered, but this increases the equipment cost and the maintenance thereof is also expensive. Further, the configuration of the line of weld varies in each instance due to the manufacturing tolerances of the components parts such as blades which may cause difficulty in applying NC-control to such a welding operation.

MIG-welding has also been considered for welding such construction. However, the welding torch is generally cooled by water so a relatively large size cooling chamber is required to make a suitable torch; thus, this process is usually unsuitable for welding an impeller. Further, the surface of the bead produced by MIG-welding is not smooth and a smoothing operation is required.

Submerged arc welding provides satisfactory results under certain conditions. However, it is difficult to obtain a satisfactory bead unless a high current is used. Also, supplying flux to a curved area is difficult.

SUMMARY OF THE INVENTION

Accordingly, there has been a need for a way of welding an impeller having a narrow width in its discharge portion without the drawbacks heretofore mentioned.

It is an object of the present invention to provide a method and an apparatus for welding an impeller having narrow width in its discharge portion substantially without requiring hardly any post finishing operation.

It is a further object of the present invention to provide a method and an apparatus for welding an impeller of the type mentioned described above which gives higher fatigue strength to the welded portion.

It is still another object of the present invention to provide a method and an apparatus for welding an impeller of the type described in which both the apparatus and maintenance cost are reasonable and which are applicable to weld different shaped blades to a shroud plate.

The objects above are attained by the present invention.

The method and apparatus of the present invention employs a TIG-welding torch head supported at one end of a torch rod, the opposite end of which is universally mounted. The base metals, i.e. the shroud plate and the blade to be welded thereto, are disposed to direct a channel formed thereby with an angle of substantially 90° therebetween upwardly so that the plate and blade are each at substantially a 45° angle to a horizontal plane and the channel lies in a substantially horizontal plane. In other words, this condition may be described as a V-shaped channel lying in a substantially horizontal plane with both sides directed upwardly substantially at a 45° angle relative to the horizontal plane. At the bottom of the V-shaped channel is disposed a filler wire of suitable length and the torch head sapported at the tip of the torch rod is placed above the filler wire so that the head contacts both the members constituting the V-shaped channel, i.e. the shroud plate and the blade, while maintaining a proper distance between a tungsten electrode of the torch head and the filler wire. Since the opposite end of the torch rod is universally mounted on a translating mechanism, the movement of the translating mechanism in a direction somewhat parallel to the longitudinal direction of the V-channel causes the movement of the torch head along the longitudinal direction while remaining in contact with both members defining the V-shaped channel due to gravity. Thus, with injection of an inert-gas through the nozzle in the torch head, the TIG-welding can be performed from one end of the V-shaped channel to the opposite end by moving the torch head by the translating mechanism. The filler wire may be placed in position either by tack-welding at several portions or bending over the extra length thereof around the blade to be welded.

The other objects as well as advantages and effects of the present invention will be further clarified by the description of the preferred embodiments of the present invention which follows the brief explanation of the drawings given below.

DESCRIPTION OF THE PREFERRED EMBODIMENTS

Figure 3:
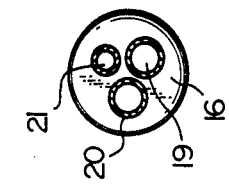
FIG. 3 is a cross-sectional view taken along the line III—III in FIG. 2.
Figure 1:
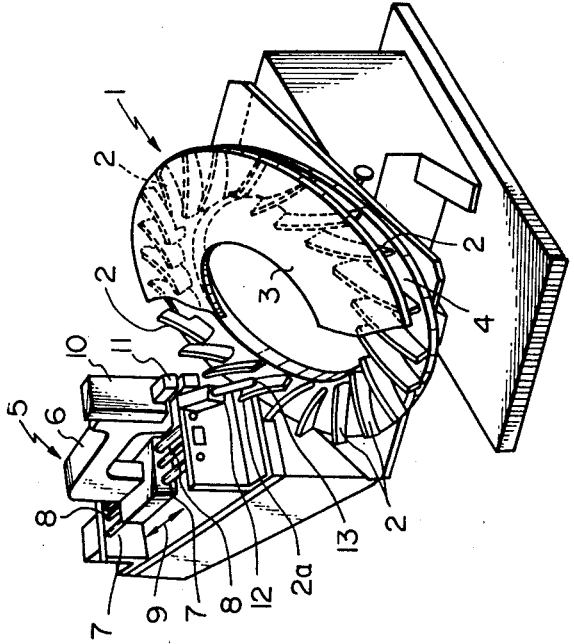
FIG. 1 is a perspective view of an apparatus according to the present invention in operation.

Referring to FIG. 1, there is shown a perspective view of an apparatus for performing a welding operation according to the present invention. In FIG. 1, an impeller 1 being subjected to a welding operation comprises a plurality of blades 2, a primary plate 3 and a shroud plate 4, a portion of the primary plate 3 being cut away for convenience of illustration and the blades 2 already being welded to the primary plate 3 in advance of the condition illustrated in FIG. 1. Among the blades 2, the blade being subjected to the welding operation is given the reference number "2a". (This reference "2a" is used throughout the specification as well as the drawings for designating the blade being welded.) As discussed in the preamble of the present description, the shroud plate 4 and the blade 2a form a V-shaped channel which lies in substantially a horizontal plane facing upwardly with the blade 2a and the shroud plate forming an angle of substantially 45° relative to the horizontal plane, respectively. The impeller 1 being subjected to the welding operation in FIG. 1 is installed on a canted rotatable mount (not shown) for successively bringing blades 2 to the position of the blade 2a to a proper position for welding by rotating the impeller 1. There is shown a translating mechanism 5 in FIG. 1. The translating mechanism 5 includes a carriage 6 which is adapted to move reciprocatingly in the direction of arrow 9 while being guided by guide bars 7 being driven by the rotation of a lead screw 8. Further, the translating mechanism 5 is provided with a headblock 10 which is adapted to be moved up and down relative to the carriage 6. A universal joint 11 is attached to the headblock 10 at the lower end thereof for holding a welding torch assembly 12 at one end thereof by the joint 11 for universal movement relative to the headblock 10 or the carriage 6. The welding torch assembly 12 comprises a torch head 13 (which will be described later) at the tip of the elongated assembly 12 and the head 13 is arranged to ride on the upper side surfaces of the V-channel due to gravity acting on the head 13 so as to be guided thereby when the carriage moves in the direction of the arrow 9.

Figure 2:
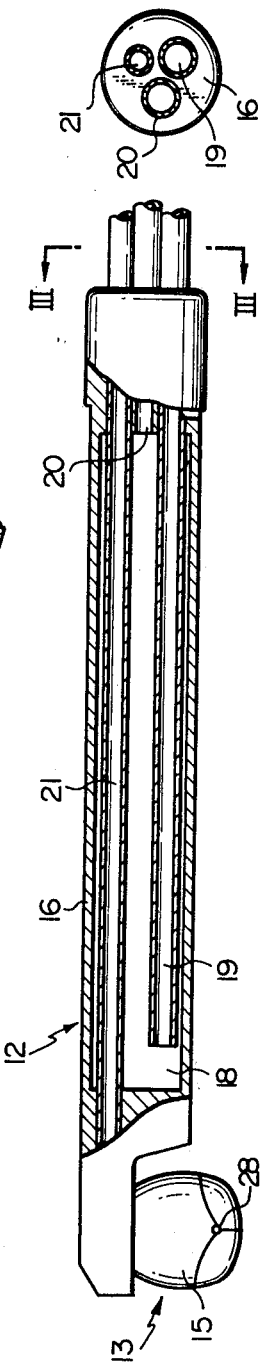
FIG. 2 is a welding torch assembly employed in the apparatus shown in FIG. 1, a portion thereof being cut away to show the cross-sectional view at that portion.
Figure 4:
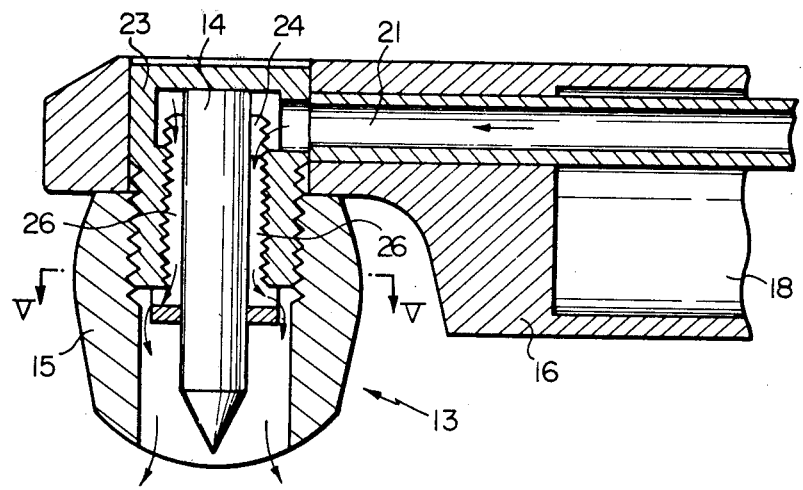
FIG. 4 is a cross-sectional view of a torch head included in the welding torch assembly shown in FIG. 2.
Figure 5:
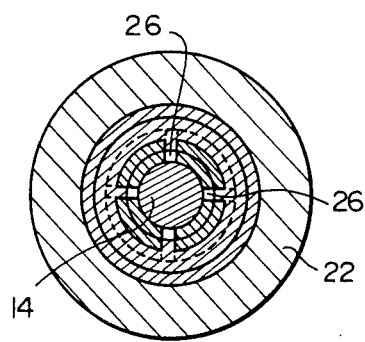
FIG. 5 is a cross-sectional view taken along the line V—V in FIG. 4.

The welding torch assembly 12 is illustrated in FIGS. 2 through 5 and comprises the torch head 13 including a tungsten electrode 14 (FIG. 4) and a nozzle 15, and a torch rod 16, the torch rod 16 being held by the universal joint 11 at the right hand end as viewed in FIG. 2. In a welding operation, a filler wire 17 of suitable length is disposed at the apex of the V-shaped channel along the length of the channel in a manner confoming to the longitudinal configuration of the apex. (Refer to FIG. 7.) By properly adjusting the translating mechanism 5, the torch head 13 is moved at first to one end of the welding line, i.e. the starting point of the welding operation, where the tip of the tungsten electrode 14 is held at a proper distance from the filler wire 17 by engagement of the torch head 13 with the inner surfaces of the V-shaped channel. When the carriage 6 is moved in the direction of the arrow 9 while injecting an inert gas through the torch nozzle 15 and supplying welding electric current between the electrode 14 and the filler wire 17, TIG-welding is performed, since the torch head 13 is guided along the V-shaped channel due to gravity thereby keeping the proper distance between the electrode and the filler wire.

Inside the torch rod 16 there is a water chamber 18 with which an inlet pipe 19 and an outlet pipe 20 communicate to pass cooling water through the chamber 18. Also, a gas pipe 21 is disposed preferably inside of the rod 16 so as to discharge inert gas through the torch nozzle 15.

The torch head 13 is supported at the left hand end of the rod as viewed in FIG. 2 and comprises, in addition to the nozzle 15 already described and which is preferably made of heat-resisting material such as ceramic and the electrode 14 also already described, a nozzle retainer 23 and an electrode holder 24. The electrode holder 24 is preferably provided with four slits 26 longitudinally arranged which communicate with a shield gas source or an inert gas source through the gas pipe 21 and are adapted to direct the gas downwardly around the electrode 14 until the gas is discharged through the opening in the nozzle 15.

Figure 6:
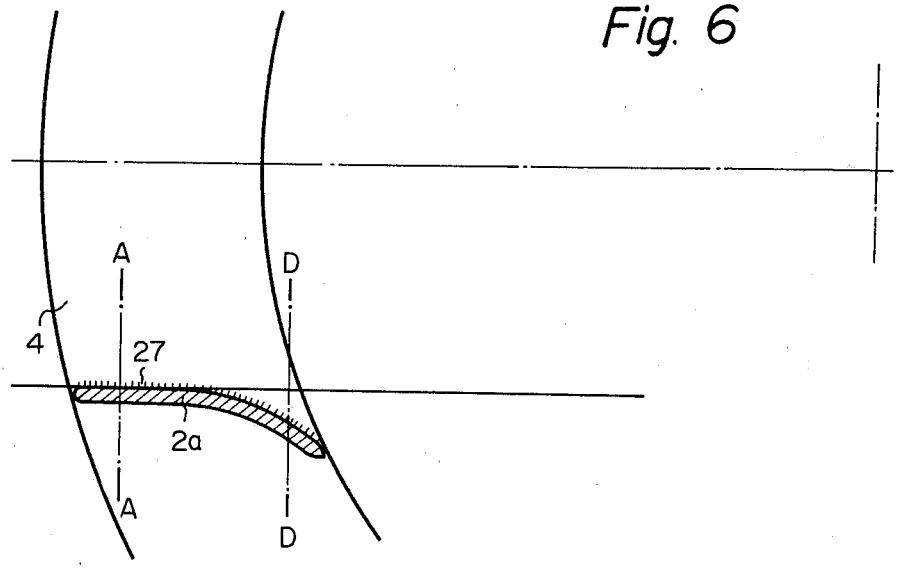
FIG. 6 is a plan view showing a curved configuration of a blade disposed substantially normal to the surface of a shroud plate.

In order to further explain the welding operation according to the present invention, reference is now made to FIG. 6. For the sake of clarity, only one of the blades 2, namely the blade 2a is shown in this drawing. The shroud plate 4 and the blade 2a form a V-shaped channel and intersection of the respective surfaces form a welding line 27. As explained hereinbefore the V-shaped channel thus formed is disposed upwardly so that both the members are canted substantially symmetrically about the vertical plane passing through the weld line 27 which is arranged to be approximately horizontal.

Figure 7:
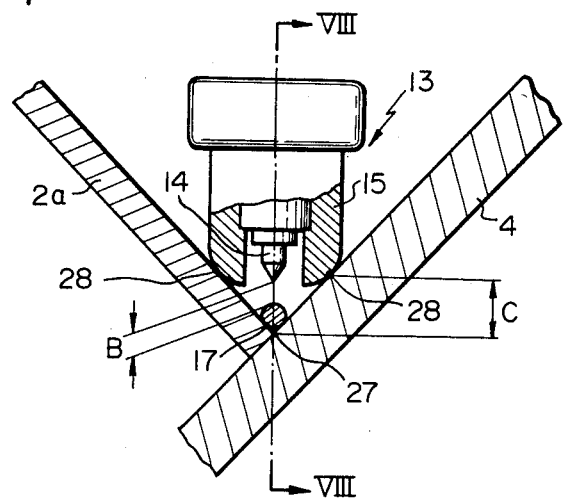
FIG. 7 is a cross-sectional view taken perpendicularly to the weld line illustrating the relationship among the members and elements concerned.

FIG. 7 illustrates the condition in the cross-section at line A—A in FIG. 6 wherein the torch head 13 is riding on the inner surfaces of the V-shaped channel above the line A—A in FIG. 6. The torch nozzle 15 is shaped so that it contacts the V-shaped channel at opposite points 28 on the outer periphery of the torch nozzle 15 so as to maintain a predetermined distance "B" between the tip of the tungsten electrode 14 and the filler wire 17. In other words, the respective positions of the contact points 28 are determined so that the points 28 will be at the height "C" vertically mesured from the bottom of the V-shaped channel, i.e. the line 27 in order to maintain the predetermined distance "B".

If the welding line 27 is substantially straight, the configuration around the contact points 28 is not subjected to a particular limitation and a line contact may be substituted for the point contact. However, in a practical application, particularly in the case of welding an impeller, the blades are usually curved due to their fluid dynamic feature. To explain the situation where the weld line is curved, reference is further made to FIGS. 8 and 9.

Figure 8:
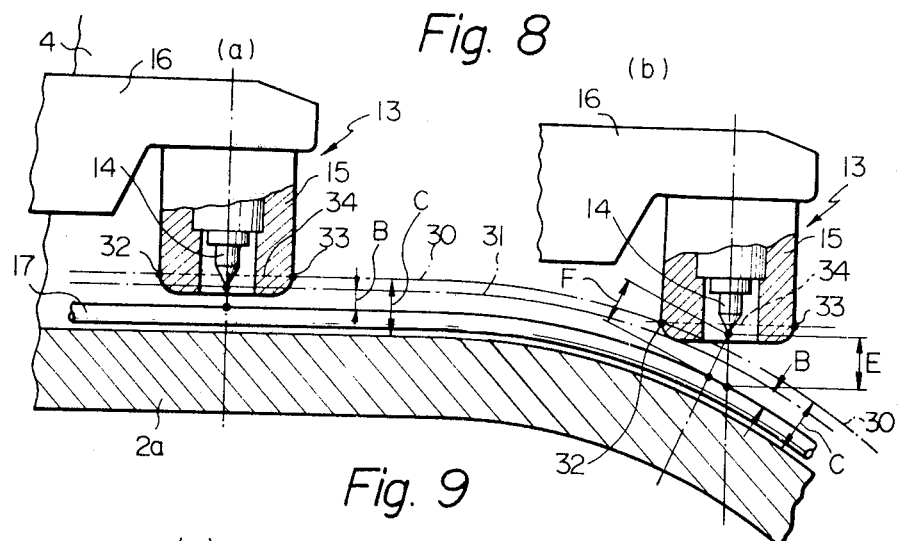
FIG. 8 is a schematic cross-sectional view taken along the line VIII—VIII in FIG. 7 showing the welding head at various positions along the blade, the head at position (a) welding along a straight line and at (b) welding along a curved line.

FIG. 8, position (a) illustrates the condition wherein the torch head 13 is riding above the line A—A in FIG. 6 while FIG. 8, position (b) illustrates the condition wherein the torch head 13 is riding above the line D—D in FIG. 6 where the weld line 27 is curved downwardly. For convenience of explanation, the configuration of the nozzle 15 is assumed to be substantially square or rectangular in cross-section taken normal to the vertical axis of the torch head 13 or the nozzle 15.

In FIG. 8, 30 denotes the locus of a point on the shroud plate 4 having a height "C" vertically measured from the bottom of the V-shaped channel and which coincides with the locus of the point 28 in FIG. 7 as long as the point 28 is confined within a portion corresponding to the straight portion of the weld line 27. Also, 31 in FIG. 8 denotes the locus of a point spaced vertically a distance "B" from the surface of the filler wire 17 which is, of course, uniformly spaced from the line 30. Under the assumption that the cross-section of the nozzle 15 is square or rectangular, the contact between the shroud 4 and the nozzle 15 in the region of FIG. 8, position (a) where the line 27 is substantially straight constitutes a line 34 having terminating opposite end points 32 and 33, the line 34 having parallel to the surface of the drawing. Of course, the portion of the head 15 below the contact line 34 is trimmed similar to that shown in FIG. 7 below the points 28 so that there will be no interference between the nozzle 15 and the inner surface of the V-shaped channel. If the torch head 15 is above the straight portion of the weld line 27, the contact line 34 moves coincident with the locus 30, the tip of the tungsten electrode 14 being held the predetermined distance "B" from the filler wire 17. However, if the torch head 13 proceeds beyond the straight portion of the weld line 27, the nozzle 15 contacts the shroud plate 4 at only one point 32 on the surface of the head 15 whereby the tip of the tungsten electrode 14 is no longer on the locus 31 and the distance between the filler wire 17 and the tip of the tungsten electrode 14 becomes "E" in a vertical direction or "F" in the radial direction of the curved portion, both of the distances "E" and "F" being greater than the predetermined distance "B" thereby tending to produce an unsatisfactory weld bead.

Figure 9:
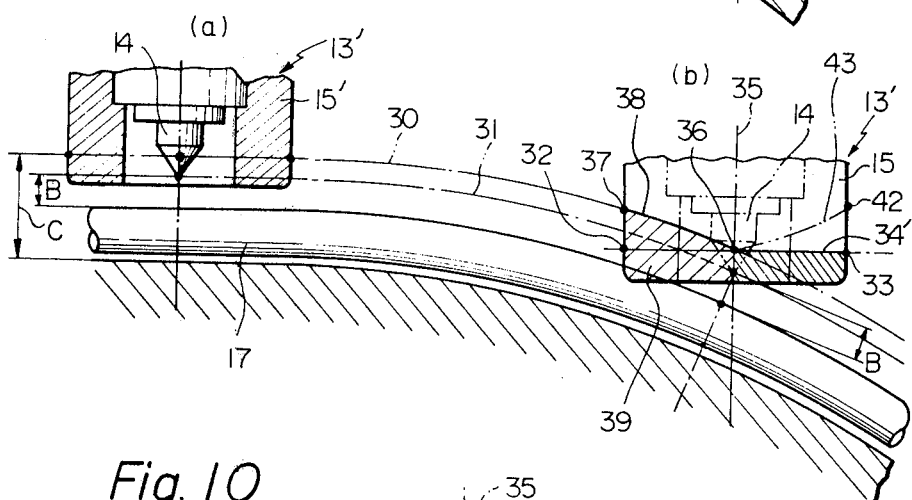
FIG. 9 is similar to FIG. 8 but illustrates how the proper distance between the electrode and the filler wire is maintained at the curved portion of the weld line.

In order to eliminate this deficiency as explained referring to FIG. 8, an improved nozzle 15' or torch head 13' is illustrated in FIG. 9. The illustration in the portion of FIG. 9, position (a) is the same as that in FIG. 8, position (a). In FIG. 9, position (b), the torch head 15' is in the curved position corresponding to that of FIG. 8, position (b). In this position, the hatched portion 39 of the nozzle 15' is trimmed off to such an extent that the radial distance between the tip of the electrode 14 and the surface of the filler wire 17 becomes equal to "B". The hatched portion 39 defined by a upper boader line 38 terminating at an point 37 may be conveniently referred to as "an interfering portion". When the interfering portion is removed from the nozzle 15', the distance "B" between the tip of the electrode 14 and the surface of the filler wire 17 is held constant in the portion corresponding to the straight welding line by engagement of the nozzle 15' and the shroud surface 4 at a line 34' partially corresponding the contact line 34 in FIG. 8, and at the curved portion, it is maintained by engagement of a point 36 corresponding to the point 28 (FIGS. 2 and 7), with the surface of the shroud plate 4, the point 36 being on the border line 38 where it crosses the vertical plane normal to the drawing and passing through the vertical central axis 35 of the nozzle 15'. Although, for convenience, engagement between the shroud plate 4 and the peripheral surface of the nozzle 15 or 15' has been discussed, the engagement between the blade 2a and the peripheral surface of the nozzle 15 or 15' is similarly effected during the movement of the nozzle along the weld line.

Also, although the shape of the nozzle before trimming has been described as square or rectangular in cross-section with respect to FIGS. 8 and 9, it is not limited to such shapes and it may take any shape such as cylindrical or spherical provided that the distance "B" between the tip of the electrode and the surface of the filler wire is maintained during the movement of the torch head in the V-shaped channel.

The case where the weld line curves downwardly from the horizontal plane was explained with respect to FIG. 9. In case the weld line curves upwardly from the horizontal plane, an interference portion of the torch head located on the righthand side of the axis 35 may be trimmed off. An upper border line of the interfering portion may be represented by the curved line 43 in FIG. 9, position (b). If the curvature of the blades is the same in the upward and downward directions, trimming may be symmetrical as viewed in FIG. 9(b) about the axis 36 so that the upper border lines on both left and right hand sides become similar to the curved line 38 which may be used for the weld lines curved upwardly as well as downwardly.

Figure 10:
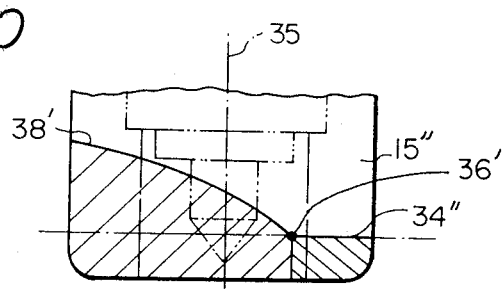
FIG. 10 illustrates a modified shape of a torch nozzle according to the present invention.

Although in the foregoing, the angle formed by the shroud plate 4 and the blade 2a has been described as substantially 90°, it may vary depending on the design of the impeller. For instance, the angle in the curved weld line may be less than 90° and, if so, the distance "B" may not be held constant even when using the nozzle 15' illustrated in FIG. 9, position (b). To accommodate the torch head in such a situation, the portion trimmed may be enlarged as illustrated in FIG. 10 so that a new contact point 36' on the peripheral surface of the torch nozzle 15" is shifted to the righthand side when the weld line curves downwardly. With this nozzle 15", a contact line 34" serves to guide the nozzle 15" along the straight weld line and the point 36' serves to guide the same along the curved weld line so that the distance between the tip of the electrode and the filler wire can be kept constant. If the angle is greater than 90°, the point 36' may be shifted to the lefthand side of the central axis 35. Further, this modification may be applicable to the straight line weld portion if the included angle deviates from 90° in desing.

As to the torch rod 16, it is sometimes preferable to make it and the gas pipe 21 from deformable material so that the rod 16 and pipe 21 may be easily shaped to conform to the curvature of the weld line whereby the torch assembly can be used in a narrower width of the discharge port compared to the case where a straight torch rod is employed.

Since the present invention employs a welding torch assembly supported at one end by a universal joint on a translational carriage, the torch head is kept in contact with the inner surface of the upwardly directed V-channel by gravity and the head follows the shape of the weld line of the V-shaped channel without need of any complicated control such as NC during the movement of the carriage thereby enabling carrying out the operation within a limited space. Further, it is devised to employ a TIG-welding process, so the weld bead produced according to the present invention is substantially free from any surface defect requiring post welding treatment such as grinding or filing.

The present invention has been described in detail referring to the preferred embodiments. However, it is to be noted that the present invention is not limited to those described and that modifications and changes are readily available to those skilled in the art within the spirit and scope of the present invention as defined in the claims appended hereto.

What is claimed is:

1. A method for welding a curved impeller blade to a supporting plate of an impeller, comprising:

holding the impeller plate and impeller blade in positions to define between them a V-shaped channel having an apex constituting a weld line including a straight horizontal portion and further including a curved portion extending continuously from the straight horizontal portion and within a plane inclined with respect to a horizontal plane;

placing a filler wire in the bottom of said V-shaped channel;

moving along said weld line a welding torch assembly having a welding electrode, a nozzle surrounding said electrode and in which said electrode is mounted and having a passage for an inert gas, said nozzle having an exterior shape with the opposite sides thereof shaped for contacting the inner surfaces of said V-shaped channel for maintaining a substantially fixed distance between the tip of said electrode and the straight horizontal portion of the apex of said V-shaped channel, the size of the lower portion of said nozzle from the center line thereof to at least one end of the nozzle facing the direction of the length of the apex line being reduced sufficiently to give the nozzle a shape for keeping the space between said electrode and the apex of the channel substantially the same as the spacing in the straight horizontal portion of the apex during movement of said nozzle along the curved portion of the apex by avoiding interference of the nozzle with the inner surface of the V-shaped channel during movement along the curved portion of the apex;

keeping said nozzle in contact with the inner surface of said V-shaped channel during said movement; and while moving said assembly, operating said assembly to carry out welding while supplying inert gas to said nozzle.

2. A method as claimed in claim 1 in which said blade is on a primary plate of the impeller and said plate is a shroud plate of the impeller, and in which said holding step comprises placing the primary plate on said shroud plate with the blades against the shroud plate and with a V-shaped channel formed between each of the blades to be welded and the shroud plate, one of said channels facing upwardly and substantially symmetrically with respect to a vertical plane through the horizontal portion of said weld line, and said moving step comprises inserting said electrode and nozzle laterally into the upwardly facing V-shaped channel from the curved end thereof and resting said nozzle on the inner surfaces of said upwardly facing channel under gravity and then drawing the nozzle and electrode along said upwardly facing channel from the horizontal portion to the free end of the curved portion.

3. A method as claimed in claim 2 further comprising, after completing the welding along a weld line, rotating said plates and blades until the next V-shaped channel is facing upwardly and repeating the moving and welding steps.

* * * * *